(12) United States Patent
Roddy et al.

(10) Patent No.: US 7,607,482 B2
(45) Date of Patent: *Oct. 27, 2009

(54) SETTABLE COMPOSITIONS COMPRISING CEMENT KILN DUST AND SWELLABLE PARTICLES

(75) Inventors: Craig W. Roddy, Duncan, OK (US); Jiten Chatterji, Duncan, OK (US); D. Chad Brenneis, Marlow, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/283,398

(22) Filed: Sep. 11, 2008

(65) Prior Publication Data

US 2009/0088348 A1    Apr. 2, 2009

Related U.S. Application Data

(63) Continuation-in-part of application No. 11/223,669, filed on Sep. 9, 2005, now Pat. No. 7,445,669.

(51) Int. Cl.
*E21B 33/13* (2006.01)
(52) U.S. Cl. ............... 166/292; 166/293; 106/716
(58) Field of Classification Search ............ 166/292, 166/293; 106/716
See application file for complete search history.

(56) References Cited

U.S. PATENT DOCUMENTS

| | | | |
|---|---|---|---|
| 2,094,316 A | 9/1937 | Cross et al. | |
| 2,329,940 A | 9/1943 | Ponzer | |
| 2,842,205 A | 7/1958 | Allen et al. | |
| 2,848,051 A | 8/1958 | Willaims | |
| 2,871,133 A | 1/1959 | Palonen et al. | |
| 2,880,096 A | 3/1959 | Hurley | |
| 2,890,169 A | 6/1959 | Prokop | |
| 2,945,769 A | 7/1960 | Gama et al. | |
| 3,168,139 A | 2/1965 | Kennedy et al. | |

(Continued)

FOREIGN PATENT DOCUMENTS

CA    2153372    1/2006

(Continued)

OTHER PUBLICATIONS

"Manufacture of supplementary cementitious materials from cement kiln dust", Mishulovich et al., World Cement (1996), 27(3), p. 116-20. Abstract only.*

(Continued)

*Primary Examiner*—Paul Marcantoni
(74) *Attorney, Agent, or Firm*—Craig W. Roddy; Tumey, LLP

(57) ABSTRACT

A variety of methods and compositions are disclosed herein, including, in one embodiment, a method comprising: introducing a settable composition into a subterranean formation, wherein the settable composition comprises: a cementitious component comprising a hydraulic cement and cement kiln dust; a swellable particle; and water; and allowing the settable composition to set in the subterranean formation. Another embodiment comprises a settable composition comprising: a cementitious component comprising a hydraulic cement and cement kiln dust; a swellable particle; and water.

20 Claims, 6 Drawing Sheets
(6 of 6 Drawing Sheet(s) Filed in Color)

U.S. PATENT DOCUMENTS

| | | |
|---|---|---|
| 3,381,169 A | 4/1968 | Brock et al. |
| 3,454,095 A | 7/1969 | Messenger et al. |
| 3,467,193 A | 9/1969 | Messenger |
| 3,499,491 A | 3/1970 | Wyant et al. |
| 3,557,876 A | 1/1971 | Tragesser |
| 3,748,159 A | 7/1973 | George |
| 3,876,005 A * | 4/1975 | Fincher et al. ............... 166/292 |
| 3,887,009 A | 6/1975 | Miller et al. |
| 3,887,385 A | 6/1975 | Quist et al. |
| 4,018,617 A | 4/1977 | Nicholson |
| 4,031,184 A | 6/1977 | McCord |
| 4,036,301 A | 7/1977 | Powers et al. |
| 4,176,720 A | 12/1979 | Wilson |
| 4,268,316 A | 5/1981 | Wills et al. |
| 4,341,562 A | 7/1982 | Ahlbeck |
| RE31,190 E | 3/1983 | Detroit et al. |
| 4,407,677 A | 10/1983 | Wills et al. |
| 4,432,800 A | 2/1984 | Kneller et al. |
| 4,435,216 A | 3/1984 | Diehl et al. |
| 4,460,292 A | 7/1984 | Durham et al. |
| 4,494,990 A | 1/1985 | Harris |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,700,777 A | 10/1987 | Luers |
| 4,741,782 A | 5/1988 | Styron |
| 4,784,223 A | 11/1988 | Worrall et al. |
| 4,883,125 A | 11/1989 | Wilson et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,213,160 A | 5/1993 | Nahm et al. |
| 5,238,064 A | 8/1993 | Dahl et al. |
| 5,266,111 A | 11/1993 | Barbour |
| 5,295,543 A | 3/1994 | Terry et al. |
| 5,305,831 A | 4/1994 | Nahm |
| 5,314,022 A | 5/1994 | Cowan et al. |
| 5,327,968 A | 7/1994 | Onan et al. |
| 5,337,824 A | 8/1994 | Cowan |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,423,379 A | 6/1995 | Hale et al. |
| 5,439,056 A | 8/1995 | Cowan |
| 5,447,197 A | 9/1995 | Rae et al. |
| 5,458,195 A | 10/1995 | Totten et al. |
| 5,458,751 A | 10/1995 | Zandi et al. |
| 5,464,060 A | 11/1995 | Hale et al. |
| 5,472,051 A | 12/1995 | Brothers |
| 5,476,144 A | 12/1995 | Nahm et al. |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,624 A | 6/1996 | Riegler |
| 5,536,311 A | 7/1996 | Rodrigues |
| 5,542,782 A | 8/1996 | Carter et al. |
| 5,547,506 A | 8/1996 | Rae et al. |
| 5,569,324 A | 10/1996 | Totten et al. |
| 5,575,841 A | 11/1996 | Dry |
| 5,580,379 A | 12/1996 | Cowan |
| 5,585,333 A | 12/1996 | Dahl et al. |
| 5,588,489 A | 12/1996 | Chatterji et al. |
| 5,660,624 A | 8/1997 | Dry |
| 5,663,230 A | 9/1997 | Haman |
| 5,673,753 A | 10/1997 | Hale et al. |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,779,787 A | 7/1998 | Brothers et al. |
| 5,851,960 A | 12/1998 | Totten et al. |
| 5,866,516 A | 2/1999 | Costin |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 5,989,334 A | 11/1999 | Dry |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,261,360 B1 | 7/2001 | Dry |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,457,524 B1 | 10/2002 | Roddy |
| 6,478,869 B2 | 11/2002 | Reddy et al. |
| 6,488,763 B2 | 12/2002 | Brothers et al. |
| 6,494,951 B1 | 12/2002 | Reddy et al. |
| 6,500,252 B1 | 12/2002 | Chatterji et al. |
| 6,502,636 B2 | 1/2003 | Chatterji et al. |
| 6,508,305 B1 | 1/2003 | Brannon et al. |
| 6,524,384 B2 | 2/2003 | Griffith et al. |
| 6,527,849 B2 | 3/2003 | Dry |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 * | 6/2003 | Gleeson et al. ............. 106/705 |
| 6,610,139 B2 | 8/2003 | Reddy et al. |
| 6,610,140 B2 | 8/2003 | Vijn et al. |
| 6,613,142 B1 | 9/2003 | D'Almeida et al. |

| | | |
|---|---|---|
| 6,626,242 B2 | 9/2003 | D'Almeida et al. |
| 6,626,243 B1 | 9/2003 | Go Boncan |
| 6,631,766 B2 | 10/2003 | Brothers et al. |
| 6,645,288 B1 | 11/2003 | Darguad et al. |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,811,603 B2 | 11/2004 | Brothers et al. |
| 6,823,940 B2 | 11/2004 | Reddy et al. |
| 6,832,651 B2 | 12/2004 | Ravi et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,887,833 B2 | 5/2005 | Brothers et al. |
| 6,889,767 B2 | 5/2005 | Reddy et al. |
| 6,902,001 B2 | 6/2005 | Dargaud et al. |
| 6,904,971 B2 | 6/2005 | Brothers et al. |
| 6,907,928 B2 | 6/2005 | Di Lullo |
| 6,907,929 B2 | 6/2005 | Leroy-Delage et al. |
| 6,908,508 B2 | 6/2005 | Brothers |
| 6,911,078 B2 | 6/2005 | Barlet-Gouedard et al. |
| 6,926,081 B2 | 8/2005 | Sweatman |
| 6,962,201 B2 | 11/2005 | Brothers |
| 7,007,755 B2 | 3/2006 | Reddy et al. |
| 7,022,179 B1 | 4/2006 | Dry |
| 7,026,272 B2 | 4/2006 | Reddy et al. |
| 7,048,053 B2 | 5/2006 | Santra et al. |
| 7,059,415 B2 | 6/2006 | Bosma et al. |
| 7,077,203 B1 | 7/2006 | Roddy et al. |
| 7,138,446 B2 | 11/2006 | Reddy et al. |
| 7,143,828 B2 | 12/2006 | Reddy et al. |
| 7,143,832 B2 | 12/2006 | Freyer |
| 7,156,173 B2 | 1/2007 | Mueller |
| 7,172,022 B2 | 2/2007 | Reddy et al. |
| 7,174,962 B1 | 2/2007 | Roddy et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,264,053 B2 | 9/2007 | Vargo et al. |
| 7,284,609 B2 | 10/2007 | Roddy et al. |
| 7,284,611 B2 | 10/2007 | Reddy et al. |
| 7,294,194 B2 | 11/2007 | Reddy et al. |
| 7,296,597 B1 | 11/2007 | Freyer et al. |
| 7,303,014 B2 | 12/2007 | Reddy et al. |
| 7,335,252 B2 | 2/2008 | Reddy et al. |
| 7,337,841 B2 | 3/2008 | Ravi |
| 7,337,842 B2 | 3/2008 | Roddy et al. |
| 7,351,279 B2 | 4/2008 | Brothers |
| 7,353,870 B2 * | 4/2008 | Roddy et al. ............. 166/293 |
| 7,381,263 B2 | 6/2008 | Roddy et al. |
| 7,387,675 B2 | 6/2008 | Roddy et al. |
| 7,395,860 B2 * | 7/2008 | Roddy et al. ............. 166/293 |
| 7,422,060 B2 | 9/2008 | Hammami |
| 7,461,696 B2 | 12/2008 | Nguyen et al. |
| 7,478,675 B2 * | 1/2009 | Roddy et al. ............. 166/293 |
| 7,482,309 B2 | 1/2009 | Ravi et al. |
| 7,530,396 B1 | 5/2009 | Reddy et al. |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |
| 2003/0167970 A1 | 9/2003 | Polston |
| 2004/0007162 A1 | 1/2004 | Morioka et al. |
| 2004/0040475 A1 | 3/2004 | De La Roij et al. |
| 2004/0055748 A1 | 3/2004 | Reddy et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0144537 A1 | 7/2004 | Reddy et al. |
| 2004/0171499 A1 | 9/2004 | Ravi et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0261990 A1 | 12/2004 | Bosma et al. |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0061206 A1 | 3/2005 | Reddy et al. |
| 2005/0072599 A1 | 4/2005 | Luke et al. |
| 2005/0084334 A1 | 4/2005 | Shi et al. |
| 2005/0098317 A1 | 5/2005 | Reddy et al. |
| 2005/0113260 A1 | 5/2005 | Wood |
| 2005/0113262 A1 | 5/2005 | Ravi et al. |
| 2005/0133221 A1 | 6/2005 | Chatterji et al. |
| 2005/0199401 A1 | 9/2005 | Patel et al. |
| 2006/0025312 A1 | 2/2006 | Santra et al. |
| 2006/0054319 A1 | 3/2006 | Fyten et al. |
| 2006/0086503 A1 | 4/2006 | Reddy et al. |
| 2006/0122071 A1 | 6/2006 | Reddy et al. |
| 2006/0162926 A1 | 7/2006 | Roddy |
| 2006/0166834 A1 | 7/2006 | Roddy |
| 2006/0260512 A1 | 11/2006 | Nordmeyer |
| 2007/0012436 A1 | 1/2007 | Freyer |
| 2007/0017676 A1 | 1/2007 | Reddy et al. |
| 2007/0056475 A1 | 3/2007 | Roddy et al. |
| 2007/0056479 A1 | 3/2007 | Gray |
| 2007/0056733 A1 | 3/2007 | Roddy et al. |
| 2007/0056735 A1 | 3/2007 | Bosma et al. |
| 2007/0062691 A1 | 3/2007 | Reddy et al. |
| 2007/0102157 A1 * | 5/2007 | Roddy et al. ............. 166/291 |
| 2007/0137528 A1 | 6/2007 | LeRoy-Delage et al. |
| 2007/0142547 A1 | 6/2007 | Vaidya |
| 2007/0151484 A1 | 7/2007 | Reddy et al. |
| 2007/0151724 A1 | 7/2007 | Ohmer et al. |
| 2007/0151730 A1 | 7/2007 | Reddy et al. |
| 2007/0186820 A1 | 8/2007 | O'Hearn |
| 2007/0204765 A1 | 9/2007 | Le-Roy-Delage et al. |
| 2007/0227734 A1 | 10/2007 | Freyer |
| 2007/0246225 A1 | 10/2007 | Hailey et al. |
| 2008/0017376 A1 | 1/2008 | Badalamenti et al. |
| 2008/0099203 A1 | 5/2008 | Mueler et al. |
| 2008/0108524 A1 | 5/2008 | Willberg et al. |
| 2008/0135250 A1 | 6/2008 | Bosma et al. |
| 2008/0156491 A1 | 7/2008 | Roddy et al. |
| 2008/0229979 A1 | 9/2008 | Lewis et al. |
| 2008/0261027 A1 | 10/2008 | Li et al. |
| 2008/0261834 A1 | 10/2008 | Simon |
| 2009/0071650 A1 * | 3/2009 | Roddy et al. ............. 166/293 |
| 2009/0124522 A1 * | 5/2009 | Roddy ........................ 507/269 |

FOREIGN PATENT DOCUMENTS

| | | |
|---|---|---|
| EP | 0814067 | 12/1997 |
| EP | 1236701 | 9/2002 |
| EP | 1394137 | 7/2003 |
| EP | 1348831 | 10/2003 |

| | | |
|---|---|---|
| GB | 1469954 | 4/1997 |
| GB | 2429725 | 3/2007 |
| JP | 52117316 | 10/1977 |
| JP | 10110487 | 4/1998 |
| SU | 1373781 | 2/1988 |
| WO | WO 83/01443 | 4/1983 |
| WO | WO 98/54108 | 12/1998 |
| WO | WO 00/63134 | 1/2000 |
| WO | WO 03/008756 | 1/2003 |
| WO | WO 03/031364 | 4/2003 |
| WO | WO 2004/057715 | 7/2004 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO2006032841 | 3/2006 |
| WO | WO 2006/053896 | 5/2006 |

OTHER PUBLICATIONS

U.S. Appl. No. 12/263,954, filed Nov. 3, 2008, Roddy.
U.S. Appl. No. 12/264,010, filed Nov. 3, 2008, Roddy
U.S. Appl. No. 12/283,398, filed Sep. 11, 2008, Roddy.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art", Petroleum Engineer International, Apr. 1978.
Sugama, "Hot Alkali Carbonation of Sodium Metaphosphate Modified Fly Ash/Calcium Aluminate Blend Hydrothermal Cements", pp. 1661-1672, Sep. 11. 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential For Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder" dated 1999.
HES Brochure "HR-4 Cement Retarder", 1999.
HES Brochure HR-5 Cement Additive, 1998.
HES Brochure "HR-7 Cement Retarder", 1999.
HES Brochure "Pozmix Cement and Pozmix 140".
HES Brochure "SCR-100 Cement Retarder A Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LaFarge brochure "TerraCem™", Aug. 2006.
LaFarge MSDS "Cement Kiln Dust", Mar. 3, 2005.
LaFarge MSDS "LaFarge Blended Cement (cement)", Mar. 3, 2005.
TXI Material Safety Data Sheet for Pressur-Seal, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-793, 2005.
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/416,754 (Notice of Allowance), Jul. 2, 2007.
Office Action from U.S. Appl. No. 11/223,485 (Notice of Allowance), Aug. 3, 2007.
Office Action from U.S. Appl. No. 11/257,261, Aug. 10, 2007.
Office Action from U.S. Appl. No. 11/271,690 (Notice of Allowance), Aug. 13, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/416,754 (Notice of Allowance), Oct. 17, 2007.
Office Action from U.S. Appl. No. 11/257,261 (Notice of Allowance), Oct. 23, 2007.
Office Action from U.S. Appl. No. 11/402,741, Oct. 24, 2007.
Office Action from U.S. Appl. No. 11/223,750 (Notice of Allowance), Dec. 11, 2007.
Office Action from U.S. Appl. No. 11/402,741 (Notice of Allowance), Dec. 13, 2007.
Office Action from U.S. Appl. No. 11/223,669, Jan. 29, 2008.
Office Action from U.S. Appl. No. 11/256,824 (Notice of Allowance), Feb. 27, 2008.
Office Action from U.S. Appl. No. 11/223,703 (Notice of Allowance), Feb. 27, 2008.
Office Action from U.S. Appl. No. 11/223,669, Apr. 8, 2008.
Office Action from U.S. Appl. No. 11/223,669 (Notice of Allowance), Jun. 30, 2008.

Foreign Search Report from a Related Application, Sep. 9, 2005.
Foreign Search Report from a Related Application, Jul. 5, 2006.
Foreign Search Report from a Related Application, Oct. 27, 2006.
Foreign Search Report from a Related Application, Nov. 2, 2006.
Foreign Search Report from a Related Application, Dec. 1, 2006.
Foreign Search Report from a Related Application, Dec. 19, 2006.
Foreign Search Report from a Related Application, May 8, 2007.
Office Action from U.S. Appl. No. 12/034,886 (Notice of Allowance), Oct. 21, 2008.
Kleverlaan, et al. "Development of Swelling Elastomer Packers in Shell E&P," Society of Petroleum Engineers, SPE/IADC 92346, pp. 1-5, 2001.
Kennedy, et al., "The Use of Swell Packers as a Replacement and Alternative to Cementing," Society of Petroleum Engineers, SPE 95713, pp. 1-4, 2005.
Laws, et al., "PDOB's Proactive Approach to Solving Zonal Isolation Challenge in Harweel HP Wells Using swell Packers," Society of Petroleum Engineers, IADC/SPE 100361, pp. 1-7, 2006.
Schlumberger brochure entitled "Futur Slurry Systems", 2007.
Cavanagh, et al., "Self-Healing Cement-Novel Technology to Achieve Leak-Free Wells," Society of Petroleum Engineers, SPEIIADC 105781, pp. 1-3, Feb. 2007.
Antonio, et al, "Swelling Packer Technology Eliminates Problems in Difficult Zonal Isolation in Tight-Gas Reservoir Completion," Society of Petroleum Engineers, SPE 107578, pp. 1-4, Apr. 2007.
Halliburton brochure entitled "Econolite Additive", Aug. 2007.
Keshka, et al., "Practical Uses of Swellable Packer Technology to Reduce Water Cut: Case Studies From the Middle East and Other Areas," Society of Petroleum Engineers, SPE 108613, pp. 1-10, Sep. 2007.
Halliburton brochure entitled "Cement Assurance MC Tool", Oct. 2007.
Halliburton brochure entitled "Cement Assurance MA Tool", Oct. 2007.
Halliburton brochure entitled "Cement Assurance HE Tool", Oct. 2007.
Halliburton brochure entitled "Well Life III Cementing Service", Apr. 2008.
Ravi, et al., "Interventionless Zonal Isolation," E&P, pp. 93-94, May 2008.
"Water-Swellable Polymer Networks—From Hydrogels to Superabsorbers," available at from http://www.sigmaaldrich.comlaldrich/technical%20ads/aLms_ad46_wateryolymers.pdf, May 22, 2008.
Bosma, et al., "Design Approach to Sealant Selection for the Life of the Well," Society of Petroleum Engineers, SPE 56536, pp. 1-14, 1999.
"Volclay Waterstop-RX," CETCO, pp. 1-4, May 2002.
"Waterstop-RX Bentonite Waterstop," Master Guideline Specification for Cast-in-Place Cement, Section 032500, pp. 1-3, Jan. 2006.
Hunter, et al., "Life-of-well isolation takes intelligence," E&P, pp. 77-78, Sep. 2007.
Moroni, et al., "Zonal Isolation in Reservoir Containing CO2 and H2S," IADC/SPE 112703, pp. 1-9, Mar. 2008.
Ravi, et al., Maximizing Heavy-Oil Recovery by Containing Steam through Optimized Cementing, SPE/PS/CHOA 117516, pp. 1-7, Oct. 2008.
Halliburton brochure entitled "LifeCem Cements," available at http://www.halliburton.com, printed from the Internet Feb. 3, 2009.
Moroni et al., "Overcoming the Weak Link in Cemented Hydraulic Isolation," Society of Petroleum Engineers, SPE 110523, pp. 1-13, Nov. 2007.
Roth et al., "Innovative Hydraulic Isolation Material Preserves Well Integrity," Society of Petroleum Engineers, IADC/SPE 112715, pp. 1-14, Mar. 2008.
Bouras et al., "Responsive Cementing Material Prevents Annular Leaks In Gas Wells," Society of Petroleum Engineers, SPE 116757, pp. 1-10, Sep. 2008.
Chang et al., "Material properties of portland cement paste with nano-montmorillonite," J Mater Science, pp. 1-10, May 2007.
USPTO Office Action dated Sep. 22, 2008 for U.S. Appl. No. 12/152,327, pp. 1-10.
USPTO Office Action dated Jan. 22, 2009 for U.S. Appl. No. 12/152,327, pp. 1-11.
USPTO Office Action dated Feb. 24, 2009 for U.S. Appl. No. 12/152,327, pp. 1-18.
Office Action from U.S. Appl. No. 12/263,800, dated May 1, 2009.
Office Action from U.S. Appl. No. 12/152,327, dated May 12, 2009.
EPO Application No. 06794648.3 Examination Report dated Apr. 17, 2009, pp. 1-8.
EPO Application No. 06779194.7 Examination Report dated May 29, 2009, pp. 1-5.
USPTO Office Action for U.S. Appl. No. 12/152,327 dated Jul. 9, 2009.
HES Brochure "Pozmix A Cement Additive", 1999.
USPTO Office Action for U.S. Appl. No. 12/263,800 dated Jul. 28, 2009.
USPTO Office Action for U.S. Appl. No. 12/420,630 dated Aug. 3, 2009.

* cited by examiner

SETTABLE COMPOSITIONS COMPRISING CEMENT KILN DUST AND SWELLABLE PARTICLES

BACKGROUND

This application is a continuation-in-part of U.S. patent application Ser. No. 11/223,669, entitled "Settable Compositions Comprising Cement Kiln Dust and Additives(s)," filed Sep. 9, 2005, the entire disclosure of which is hereby incorporated by reference.

BACKGROUND

The present invention relates to cementing operations and, more particularly, to settable compositions comprising hydraulic cement, cement kiln dust ("CKD"), swellable particles, and water and associated methods of use.

Settable compositions may be used in a variety of subterranean applications. As used herein, the term "settable composition" refers to any composition that over time will set to form a hardened mass. One example of a settable composition comprises hydraulic cement and water. Subterranean applications that may involve settable compositions include, but are not limited to, primary cementing, remedial cementing, and drilling operations.

Settable compositions may be used in primary cementing operations whereby pipe strings, such as casing and liners, are cemented in well bores. In performing primary cementing, a settable composition may be pumped into an annular space between the walls of a well bore and the pipe string disposed therein. The settable composition sets in the annular space, thereby forming an annular sheath of hardened cement (e.g., a cement sheath) that supports and positions the pipe string in the well bore and bonds the exterior surface of the pipe string to the walls of the well bore.

Settable compositions also may be used in remedial cementing operations, such as sealing voids in a pipe string or a cement sheath. As used herein the term "void" refers to any type of space, including fractures, holes, cracks, channels, spaces, and the like. Such voids may include: holes or cracks in the pipe strings; holes, cracks, spaces, or channels in the cement sheath; and very small spaces (commonly referred to as "microannuli") between the cement sheath and the exterior surface of the well casing or formation. Sealing such voids may prevent the undesired flow of fluids (e.g., oil, gas, water, etc.) and/or fine solids into, or from, the well bore.

The sealing of such voids, whether or not made deliberately, has been attempted by introducing a substance into the void and permitting it to remain therein to seal the void. If the substance does not fit into the void, a bridge, patch, or sheath may be formed over the void to possibly produce a termination of the undesired fluid flow. Substances used heretofore in methods to terminate the undesired passage of fluids through such voids include settable compositions comprising water and hydraulic cement, wherein the methods employ hydraulic pressure to force the settable composition into the void. Once placed into the void, the settable composition may be permitted to harden.

Remedial cementing operations also may be used to seal portions of subterranean formations or portions of gravel packs. The portions of the subterranean formation may include permeable portions of a formation and fractures (natural or otherwise) in the formation and other portions of the formation that may allow the undesired flow of fluid into, or from, the well bore. The portions of the gravel pack include those portions of the gravel pack, wherein it is desired to prevent the undesired flow of fluids into, or from, the well bore. A "gravel pack" is a term commonly used to refer to a volume of particulate materials (such as sand) placed into a well bore to at least partially reduce the migration of unconsolidated formation particulates into the well bore. While screenless gravel packing operations are becoming more common, gravel packing operations commonly involve placing a gravel pack screen in the well bore neighboring a desired portion of the subterranean formation, and packing the surrounding annulus between the screen and the well bore with particulate materials that are sized to prevent and inhibit the passage of formation solids through the gravel pack with produced fluids. Among other things, this method may allow sealing of the portion of the gravel pack to prevent the undesired flow of fluids without requiring the gravel pack's removal.

Settable compositions also may be used during the drilling of the well bore in a subterranean formation. For example, in the drilling of a well bore, it may be desirable, in some instances, to change the direction of the well bore. In some instances, settable compositions may be used to facilitate this change of direction, for example, by drilling a pilot hole in a hardened mass of cement, commonly referred to as a "kickoff plug," placed in the well bore.

Certain formations may cause the drill bit to drill in a particular direction. For example, in a vertical well, this may result in an undesirable well bore deviation from vertical. In a directional well (which is drilled at an angle from vertical), after drilling an initial portion of the well bore vertically, the direction induced by the formation may make following the desired path difficult. In those and other instances, special directional drilling tools may be used, such as a whipstock, a bent sub-downhole motorized drill combination, and the like. Generally, the directional drilling tool or tools used may be orientated so that a pilot hole is produced at the desired angle to the previous well bore in a desired direction. When the pilot hole has been drilled for a short distance, the special tool or tools are removed, if required, and drilling along the new path may be resumed. To help ensure that the subsequent drilling follows the pilot hole, it may be necessary to drill the pilot hole in a kickoff plug, placed in the well bore. In those instances, prior to drilling the pilot hole, a settable composition may be introduced into the well bore and allowed to set to form a kickoff plug therein. The pilot hole then may be drilled in the kickoff plug, and the high strength of the kickoff plug helps ensure that the subsequent drilling proceeds in the direction of the pilot hole.

Settable compositions used heretofore commonly comprise Portland cement. Portland cement generally is a major component of the cost for the settable compositions. To reduce the cost of such settable compositions, other components may be included in the settable composition in addition to, or in place of, the Portland cement. Such components may include fly ash, slag cement, shale, metakaolin, micro-fine cement, and the like. "Fly ash," as that term is used herein, refers to the residue from the combustion of powdered or ground coal, wherein the fly ash carried by the flue gases may be recovered, for example, by electrostatic precipitation. "Slag," as that term is used herein, refers to a granulated, blast furnace by-product formed in the production of cast iron and generally comprises the oxidized impurities found in iron ore. Slag cement generally comprises slag and a base, for example, such as sodium hydroxide, sodium bicarbonate, sodium carbonate, or lime, to produce a settable composition that, when combined with water, may set to form a hardened mass.

During the manufacture of cement, a waste material commonly referred to as "CKD" is generated. "CKD," as that term is used herein, refers to a partially calcined kiln feed which is removed from the gas stream and collected in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

SUMMARY

The present invention relates to cementing operations and, more particularly, to settable compositions comprising hydraulic cement, CKD, swellable particles, and water and associated methods of use.

In one embodiment, the present invention provides a method comprising: introducing a settable composition into a subterranean formation, wherein the settable composition comprises a cementitious component comprising a hydraulic cement and CKD; a swellable particle; and water; and allowing the settable composition to set in the subterranean formation.

Another embodiment of the present invention provides a method comprising: introducing a settable composition into an annulus between a pipe string and a subterranean formation, wherein the settable composition comprises a cementitious component comprising a hydraulic cement and CKD; a swellable particle; and water; and allowing the settable composition to set in the annulus.

Another embodiment of the present invention provides a settable composition comprising a cementitious component comprising a hydraulic cement and CKD; a swellable particle; and water.

The features and advantages of the present invention will be apparent to those skilled in the art. While numerous changes may be made by those skilled in the art, such changes are within the spirit of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These drawings illustrate certain aspects of some of the embodiments of the present invention, and should not be used to limit or define the invention.

DESCRIPTION OF PREFERRED EMBODIMENTS

Figure 1:
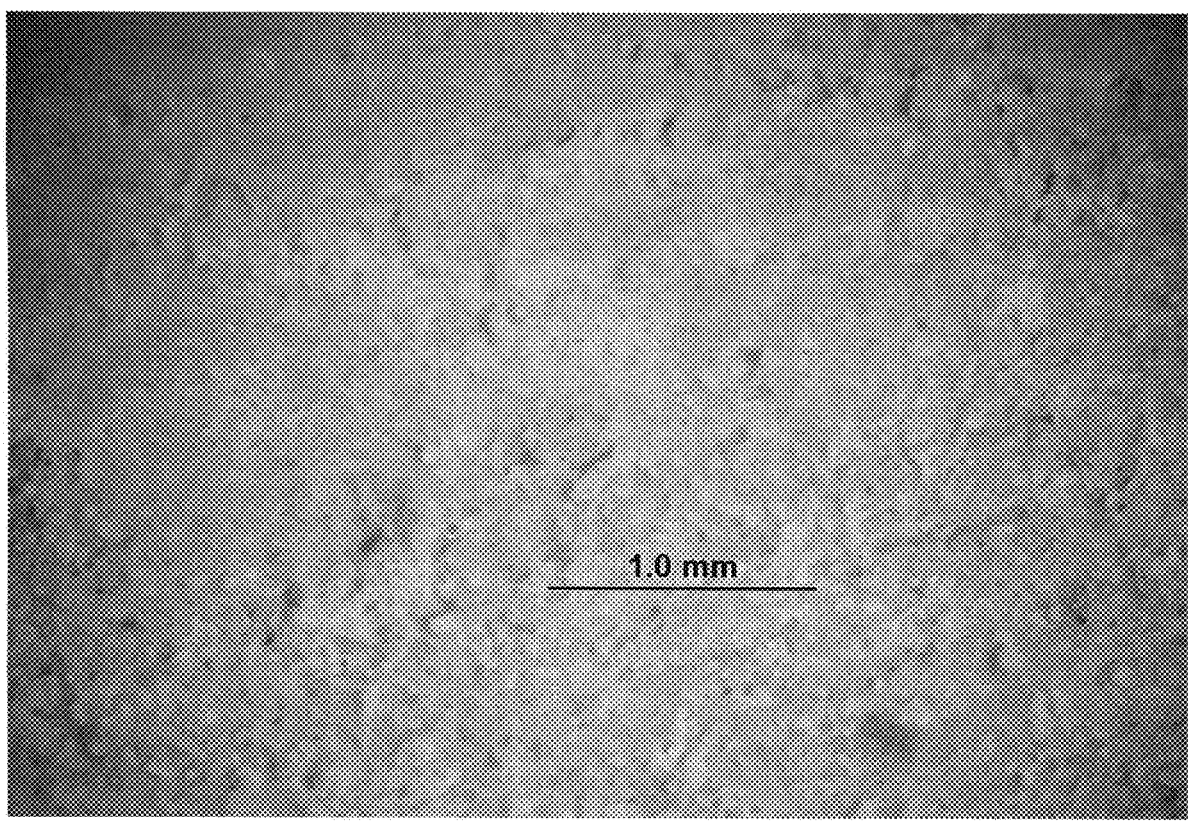
FIG. 1 is a photograph of a set cement cube comprising cement, cement kiln dust, and a water-swellable polymer, in accordance with one embodiment of the present invention.

The present invention relates to cementing operations and, more particularly, to settable compositions comprising CKD, hydraulic cement, a swellable particle, and water and associated methods of use. The settable compositions of the present invention may be used in a variety of subterranean applications, including primary cementing, remedial cementing, and drilling operations.

Settable Compositions of the Present Invention

In one embodiment, a settable composition of the present invention comprises a cementitious component comprising a hydraulic cement and CKD, swellable particles, and water. In some embodiments, a settable composition of the present invention may be foamed, for example, comprising water, a cementitious component comprising a hydraulic cement and CKD, a swellable particle, a gas, and a surfactant. A foamed settable composition may be used, for example, where it is desired for the settable composition to be lightweight. Other optional additives may also be included in the settable compositions of the present invention as desired, including, but not limited to, hydraulic cement, fly ash, slag cement, shale, zeolite, metakaolin, combinations thereof, and the like.

The settable compositions of the present invention should have a density suitable for a particular application as desired by those of ordinary skill in the art, with the benefit of this disclosure. In some embodiments, the settable compositions of the present invention may have a density in the range of from about 8 pounds per gallon ("ppg") to about 16 ppg. In the foamed embodiments, the foamed settable compositions of the present invention may have a density in the range of from about 8 ppg to about 13 ppg.

The water used in the settable compositions of the present invention may include freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may adversely affect other components in the settable composition. In some embodiments, the water may be included in an amount sufficient to form a pumpable slurry. In some embodiments, the water may be included in the settable compositions of the present invention in an amount in the range of from about 40% to about 200% by weight of the cementitious component. In some embodiments, the water may be included in an amount in the range of from about 40% to about 150% by weight of the cementitious component.

Embodiments of the settable compositions of the present invention comprise a cementitious component that comprises CKD. The CKD should be included in the settable compositions in an amount sufficient to provide the desired compressive strength, density, and/or cost reduction. In some embodiments, the CKD may be present in the settable compositions of the present invention in an amount of at least 25% by weight of the cementitious component. As used herein, the term "cementitious component" shall include the hydraulic cement and CKD. In some embodiments, the CKD may be present in the settable compositions of the present invention in an amount in the range of from about 25% to about 75% by weight of the cementitious component. In some embodiments, the CKD may be present in the settable compositions of the present invention in an amount in the range of from about 25% to about 50% by weight of the cementitious component.

Embodiments of the settable compositions of the present invention comprise a cementitious component that also comprises a hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990.

The hydraulic cement generally may be included in the settable compositions in an amount sufficient to provide the desired compressive strength, density, and/or cost. In some embodiments, the hydraulic cement may be present in the settable compositions of the present invention in an amount of at least 25% by weight of the cementitious component. In some embodiments, the hydraulic cement may be present in the settable compositions of the present invention in an amount in the range of from about 25% to about 75% by weight of the cementitious component. In some embodiments, the hydraulic cement may be present in the settable compositions of the present invention in an amount in the range of from about 50% to about 75% by weight of the cementitious component.

In some embodiments, a pozzolana cement that may be suitable for use comprises fly ash. A variety of fly ashes may be suitable, including fly ash classified as Class C and Class F fly ash according to American Petroleum Institute, *API Specification for Materials and Testing for Well Cements*, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions is required for the Class F fly ash to form a settable composition with water. In some embodiments, lime may be mixed with Class F fly ash in an amount in the range of from about 0.1% to about 25% by weight of the fly ash. In some instances, the lime may be hydrated lime. Suitable examples of fly ash include, but are not limited to, "POZ-MIX® A" cement additive, commercially available from Halliburton Energy Services, Inc., Duncan, Okla.

Where present, the fly ash generally may be included in the settable compositions in an amount sufficient to provide the desired compressive strength, density, and/or cost. In some embodiments, the fly ash may be present in the settable compositions of the present invention in an amount in the range of from about 5% to about 75% by weight of the cementitious component. In some embodiments, the fly ash may be present in the settable compositions of the present invention in an amount in the range of from about 10% to about 60% by weight of the cementitious component.

In some embodiments, a slag cement that may be suitable for use may comprise slag. Slag generally does not contain sufficient basic material, so slag cement further may comprise a base to produce a settable composition that may react with water to set to form a hardened mass. Examples of suitable sources of bases include, but are not limited to, sodium hydroxide, sodium bicarbonate, sodium carbonate, lime, and combinations thereof.

Where present, the slag cement generally may be included in the settable compositions in an amount sufficient to provide the desired compressive strength, density, and/or cost. In some embodiments, the slag cement may be present in the settable compositions of the present invention in an amount in the range of from 0% to about 75% by weight of the cementitious component. In some embodiments, the slag cement may be present in the settable compositions of the present invention in an amount in the range of from about 25% to about 50% by weight of the cementitious component.

Embodiments of the settable compositions of the present invention may comprise swellable particles. As used herein, a particle is characterized as swelling when it swells upon contact with oil and/or an aqueous fluid (e.g., water). Swellable particles suitable for use in embodiments of the present invention may generally swell by up to about 50% of their original size at the surface. Under downhole conditions, this swelling may be more, or less, depending on the conditions presented. For example, the swelling may be at least 10% at downhole conditions. In some embodiments, the swelling may be up to about 50% under downhole conditions. However, as those of ordinary skill in the art, with the benefit of this disclosure, will appreciate, the actual swelling when the swellable particles are included in a settable composition may depend on, for example, the concentration of the swellable particles included in the settable composition. In accordance with embodiments of the present invention, the swellable particles may be included in the settable composition, for example, to counteract the formation of cracks in the cement sheath and/or micro-annulus between the cement sheath and the pipe string or the formation. In general, the swellable particles should be capable of swelling when contacted by aqueous fluids and/or oil to inhibit fluid flow through the crack and/or micro-annulus. Accordingly, the swellable particles may prevent and/or reduce the loss of zonal isolation in spite of the formation of cracks and/or micro-annulus, potentially resulting in an improved annular seal for the extended cement compositions.

An example of swellable particles that may be utilized in embodiments of the present invention comprises a swellable elastomer. Some specific examples of suitable swellable elastomers include, but are not limited to, natural rubber, acrylate butadiene rubber, polyacrylate rubber, isoprene rubber, choloroprene rubber, butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorborneane), and alkylstyrene. One example of a suitable swellable elastomer comprises a block copolymer of a styrene butadiene rubber. Examples of suitable elastomers that swell when in contact with oil include, but are not limited to, nitrile rubber (NBR), hydrogenated nitrile rubber (HNBR, HNS), fluoro rubbers (FKM), perfluoro rubbers (FFKM), tetrafluoroethylene/propylene (TFE/P), isobutylene maleic anhydride. Combinations of suitable swellable elastomers may also be used. Other swellable elastomers that behave in a similar fashion with respect to oil or aqueous fluids also may be suitable. Those of ordinary skill in the art, with the benefit of this disclosure, will be able to select an appropriate swellable elastomer for use in embodiments of the settable compositions of the present invention based on a variety of factors, including the application in which the composition will be used and the desired swelling characteristics.

An example of swellable particles that may be utilized in embodiments of the present invention comprises a water-swellable polymer. Some specific examples of suitable water-swellable polymers, include, but are not limited to starch-polyacrylate acid graft copolymer and salts thereof, polyethylene oxide polymer, carboxymethyl cellulose type polymers, polyacrylamide, poly(acrylic acid) and salts thereof, poly(acrylic acid-co-acrylamide) and salts thereof, graft-poly(ethylene oxide) of poly(acrylic acid) and salts thereof, poly(2-hydroxyethyl methacrylate), and poly(2-hydroxypropyl methacrylate). Combinations of suitable water-swellable polymers may also be used. In certain embodiments, the water-swellable polymers may be crosslinked and/or lightly crosslinked. Other water-swellable polymers that behave in a similar fashion with respect to aqueous fluids also may be suitable. Those of ordinary skill in the art, with the benefit of this disclosure, will be able to select appropriate water-swellable polymers for use in embodiments of the settable compositions of the present invention based on a variety of factors, including the application in which the composition will be used and the desired swelling characteristics.

Where used, the swellable particles generally may be included in the settable compositions in an amount sufficient to provide the desired mechanical properties. In some embodiments, the swellable particles may be present in the settable compositions in an amount up to about 25% by weight of the cementitious component. In some embodiments, the swellable particles may be present in the settable compositions in a range of about 5% to about 25% by weight of the cementitious component. In some embodiments, the swellable particles may be present in the settable compositions in a range of about 15% to about 20% by weight of the cementitious component.

In addition, the swellable particles that are utilized may have a wide variety of shapes and sizes of individual particles suitable for use in accordance with embodiments of the present invention. By way of example, the swellable particles may have a well-defined physical shape as well as an irregular geometry, including the physical shape of platelets, shavings, fibers, flakes, ribbons, rods, strips, spheroids, beads, pellets, tablets, or any other physical shape. In some embodiments, the swellable particles may have a particle size in the range of about 5 microns to about 1,500 microns. In some embodiments, the swellable particles may have a particle size in the range of about 20 microns to about 500 microns. However, particle sizes outside these defined ranges also may be suitable for particular applications.

In certain embodiments, the settable compositions of the present invention further may comprise metakaolin. Generally, metakaolin is a white pozzolan that may be prepared by heating kaolin clay, for example, to temperatures in the range of from about 600° to about 800° C. In some embodiments, the metakaolin may be present in the settable compositions of the present invention in an amount in the range of from about 5% to about 75% by weight of the cementitious component. In some embodiments, the metakaolin may be present in an amount in the range of from about 5% to about 25% by weight of the cementitious component. In some embodiments, the metakaolin may be present in an amount in the range of from about 10% to about 50% by weight of the cementitious component.

In certain embodiments, the settable compositions of the present invention further may comprise shale. Among other things, shale included in the settable compositions may react with excess lime to form a suitable cementing material, for example, calcium silicate hydrate. A variety of shales are suitable, including those comprising silicon, aluminum, calcium, and/or magnesium. An example of a suitable shale comprises vitrified shale. Suitable examples of vitrified shale include, but are not limited to, "PRESSUR-SEAL® FINE LCM" material and "PRESSUR-SEAL® COARSE LCM" material, which are commercially available from TXI Energy Services, Inc., Houston, Tex. Generally, the shale may have any particle size distribution as desired for a particular application. In certain embodiments, the shale may have a particle size distribution in the range of from about 37 micrometers to about 4,750 micrometers.

Where present, the shale may be included in the settable compositions of the present invention in an amount sufficient to provide the desired compressive strength, density, and/or cost. In some embodiments, the shale may be present in an amount in the range of from about 5% to about 75% by weight of the cementitious component. In some embodiments, the shale may be present in an amount in the range of from about 5% to about 25% by weight of the cementitious component. In some embodiments, the shale may be present in an amount in the range of from about 10% to about 35% by weight of the cementitious component. One of ordinary skill in the art, with the benefit of this disclosure, will recognize the appropriate amount of the shale to include for a chosen application.

In certain embodiments, the settable compositions of the present invention further may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. In some embodiments, the zeolite may be present in the settable compositions of the present invention in an amount in the range of from about 5% to about 65% by weight of the cementitious component. In some embodiments, the zeolite may be present in the settable compositions of the present invention in an amount in the range of from about 5% to about 25% by weight of the cementitious component. In certain embodiments, the zeolite may be present in an amount in the range of from about 10% to about 40% by weight of the cementitious component.

In certain embodiments, the settable compositions of the present invention further may comprise a set retarding additive. As used herein, the term "set retarding additive" refers to an additive that retards the setting of the settable compositions of the present invention. Examples of suitable set retarding additives include, but are not limited to, ammonium, alkali metals, alkaline earth metals, metal salts of sulfoalkylated lignins, hydroxycarboxy acids, copolymers that comprise acrylic acid or maleic acid, and combinations thereof. One example of a suitable sulfoalkylate lignin comprises a sulfomethylated lignin. Suitable set retarding additives are disclosed in more detail in United States Pat. No. Re. 31,190, the entire disclosure of which is incorporated herein by reference. Suitable set retarding additives are commercially available from Halliburton Energy Services, Inc. under the tradenames "HR® 4," "HR® 5," "HR® 7," "HR® 12," "HR® 15," HR® 25," "SCR™ 100," and "SCR™ 500." Generally, where used, the set retarding additive may be included in the settable compositions of the present invention in an amount sufficient to provide the desired set retardation. In some embodiments, the set retarding additive may be present in an amount in the range of from about 0.1% to about 5% by weight of the cementitious component.

Optionally, other additional additives may be added to the settable compositions of the present invention as deemed appropriate by one skilled in the art, with the benefit of this disclosure. Examples of such additives include, but are not limited to, accelerators, weight reducing additives, heavy-weight additives, lost circulation materials, filtration control additives, dispersants, and combinations thereof. Suitable examples of these additives include crystalline silica compounds, amorphous silica, salts, fibers, hydratable clays, microspheres, pozzolan lime, latex cement, thixotropic additives, combinations thereof and the like.

An example of a settable composition of the present invention may comprise a cementitious component comprising a hydraulic cement and CKD, a swellable elastomer, and water. As desired by one of ordinary skill in the art, with the benefit of this disclosure, such settable composition of the present invention further may comprise any of the above-listed additives, as well any of a variety of other additives suitable for use in subterranean applications.

Another example of a settable composition of the present invention may comprise a cementitious component comprising a hydraulic cement and CKD, a swellable elastomer, water, and an additive comprising at least one of the following group: fly ash; shale; zeolite; slag cement; metakaolin; and combinations thereof. As desired by one of ordinary skill in the art, with the benefit of this disclosure, such settable composition of the present invention further may comprise any of the above-listed additives, as well any of a variety of other additives suitable for use in subterranean applications.

As mentioned previously, in certain embodiments, the settable compositions of the present invention may be foamed with a gas. In some embodiments, foamed settable compositions of the present invention may comprise a hydraulic cement, CKD, a swellable elastomer, water, a gas, and a surfactant. Other suitable additives, such as those discussed previously, also may be included in the foamed settable compositions of the present invention as desired by those of ordinary skill in the art, with the benefit of this disclosure. The gas used in the foamed settable compositions of the present invention may be any gas suitable for foaming a settable composition, including, but not limited to, air, nitrogen, or combinations thereof. Generally, the gas should be present in the foamed settable compositions of the present invention in an amount sufficient to form the desired foam. In certain embodiments, the gas may be present in the foamed settable compositions of the present invention in an amount in the range of from about 10% to about 80% by volume of the composition.

Where foamed, the settable compositions of the present invention further comprise a surfactant. In some embodiments, the surfactant comprises a foaming and stabilizing surfactant. As used herein, a "foaming and stabilizing surfactant composition" refers to a composition that comprises one or more surfactants and, among other things, may be used to facilitate the foaming of a settable composition and also may stabilize the resultant foamed settable composition formed therewith. Any suitable foaming and stabilizing surfactant composition may be used in the settable compositions of the present invention. Suitable foaming and stabilizing surfactant compositions may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. In one certain embodiment, the foaming and stabilizing surfactant composition comprises a mixture of an ammonium salt of an alkyl ether sulfate, a cocoamidopropyl betaine surfactant, a cocoamidopropyl dimethylamine oxide surfactant, sodium chloride, and water. A suitable example of such a mixture is "ZONESEAL® 2000" foaming additive, commercially available from Halliburton Energy Services, Inc. Suitable foaming and stabilizing surfactant compositions are described in U.S. Pat. Nos. 6,797,054, 6,547,871, 6,367,550, 6,063,738, and 5,897,699, the entire disclosures of which are incorporated herein by reference.

Generally, the surfactant may be present in the foamed settable compositions of the present invention in an amount sufficient to provide a suitable foam. In some embodiments, the surfactant may be present in an amount in the range of from about 0.8% and about 5% by volume of the water ("bvow").

Methods of the Present Invention

The settable compositions of the present invention may be used in a variety of subterranean applications, including, but not limited to, primary cementing, remedial cementing, and drilling operations.

An example of a method of the present invention comprises providing a settable composition of the present invention comprising a cementitious component comprising a hydraulic cement and CKD, a swellable particle, and water; placing the settable composition in a subterranean formation; and allowing the settable composition to set. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

Another example of a method of the present invention is a method of cementing a pipe string (e.g., casing, expandable casing, liners, etc.) disposed in a well bore. An example of such a method may comprise providing a settable composition of the present invention comprising a cementitious component comprising a hydraulic cement and CKD, a swellable particle, and water; introducing the settable composition into an annulus between the pipe string and a subterranean formation surrounding the well bore; and allowing the settable composition to set in the annulus. Generally, in most instances, the set composition should fix the pipe string in the well bore. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean application.

Another example of a method of the present invention is method of sealing a portion of a gravel pack or a portion of a subterranean formation. An example of such a method may comprise providing a settable composition of the present invention comprising a cementitious component comprising a hydraulic cement and CKD, a swellable particle, and water; introducing the settable composition into the portion of the gravel pack or the portion of the subterranean formation; and allowing the settable composition to form a hardened mass in the portion. The portions of the subterranean formation may include permeable portions of the formation and fractures (natural or otherwise) in the formation and other portions of the formation that may allow the undesired flow of fluid into, or from, the well bore. The portions of the gravel pack include those portions of the gravel pack, wherein it is desired to prevent the undesired flow of fluids into, or from, the well bore. Among other things, this method may allow the sealing of the portion of the gravel pack to prevent the undesired flow of fluids without requiring the gravel pack's removal. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

Another example of a method of the present invention is a method of sealing voids located in a pipe string (e.g., casing, expandable casings, liners, etc.) or in a cement sheath. Generally, the pipe string will be disposed in a well bore, and the cement sheath may be located in the annulus between the pipe string disposed in the well bore and a wall of the well bore. An example of such a method may comprise providing a settable composition of the present invention comprising a cementitious component comprising a hydraulic cement and CKD, a swellable particle, and water; introducing the settable composition into the void; and allowing the settable composition to set to form a hardened mass in the void. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

When sealing a void in a pipe string, the methods of the present invention, in some embodiments, further may comprise locating the void in the pipe string; and isolating the void by defining a space within the pipe string in communication with the void; wherein the settable composition may be introduced into the void from the space. The void may be isolated using any suitable technique and/or apparatus, including bridge plugs, packers, and the like. The void in the pipe string may be located using any suitable technique.

When sealing a void in the cement sheath, the methods of the present invention, in some embodiments, further may comprise locating the void in the cement sheath; producing a perforation in the pipe string that intersects the void; and isolating the void by defining a space within the pipe string in communication with the void via the perforation, wherein the settable composition is introduced into the void via the perforation. The void in the pipe string may be located using any suitable technique. The perforation may be created in the pipe string using any suitable technique, for example, perforating guns. The void may be isolated using any suitable technique and/or apparatus, including bridge plugs, packers, and the like.

Another example of a method of the present invention is a method of changing the direction of drilling a well bore. An example of such a method may comprise providing a settable composition of the present invention comprising a cementitious component comprising a hydraulic cement and CKD, a swellable particle, and water; introducing the settable composition into the well bore at a location in the well bore wherein the direction of drilling is to be changed; allowing the settable composition to set to form a kickoff plug in the well bore; drilling a hole in the kickoff plug; and drilling of the well bore through the hole in the kickoff plug. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

Generally, the drilling operation should continue in the direction of the hole drilled through the kickoff plug. The well bore and hole in the kickoff plug may be drilled using any suitable technique, including rotary drilling, cable tool drilling, and the like. In some embodiments, one or more oriented directional drilling tools may be placed adjacent to the kickoff plug. Suitable directional drilling tools include, but are not limited to, whip-stocks, bent sub-downhole motorized drill combinations, and the like. The direction drilling tools then may be used to drill the hole in the kickoff plug so that the hole is positioned in the desired direction. Optionally, the directional drilling tool may be removed from the well bore subsequent to drilling the hole in the kickoff plug.

To facilitate a better understanding of the present invention, the following examples of certain aspects of some embodiments are given. In no way should the following examples be read to limit, or define, the scope of the invention.

EXAMPLE 1

Figure 2:
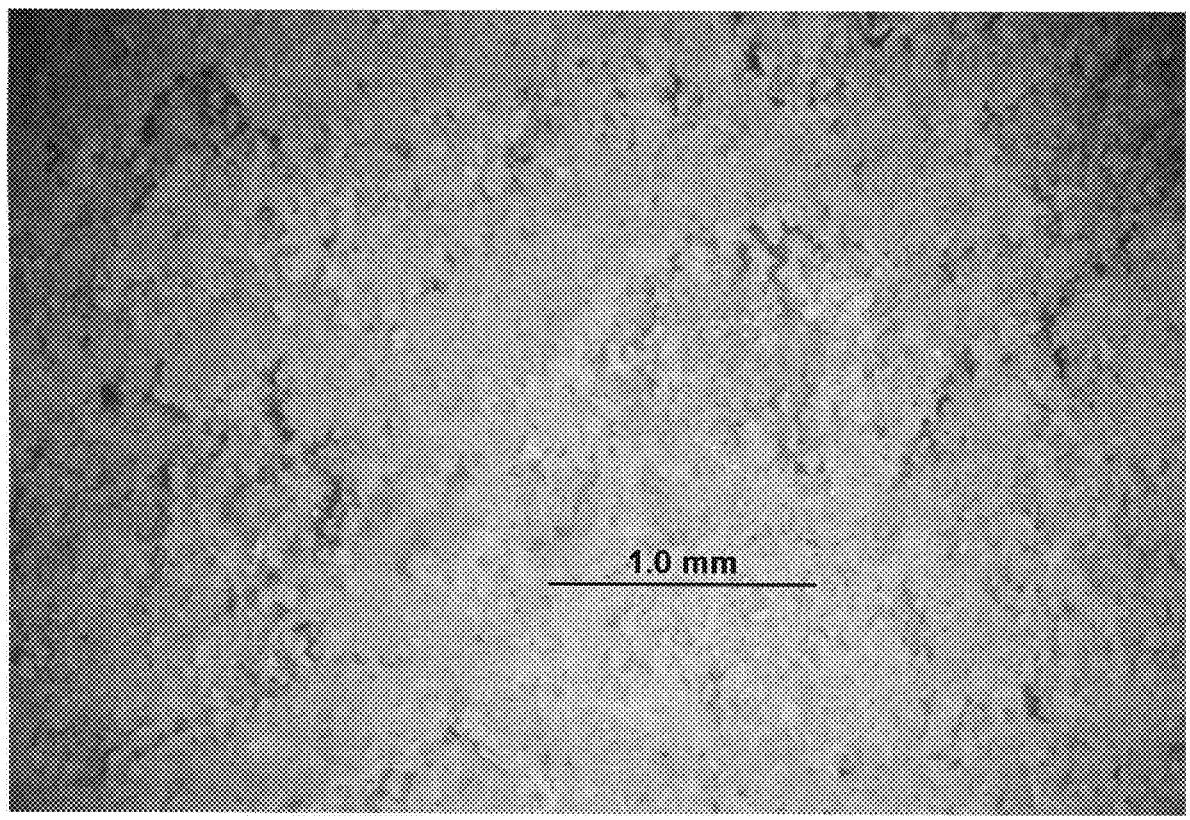
FIG. 2 is a photograph of the set cement cube of FIG. 3 after immersion in a water bath for twenty-four hours, in accordance with one embodiment of the present invention.
Figure 4:
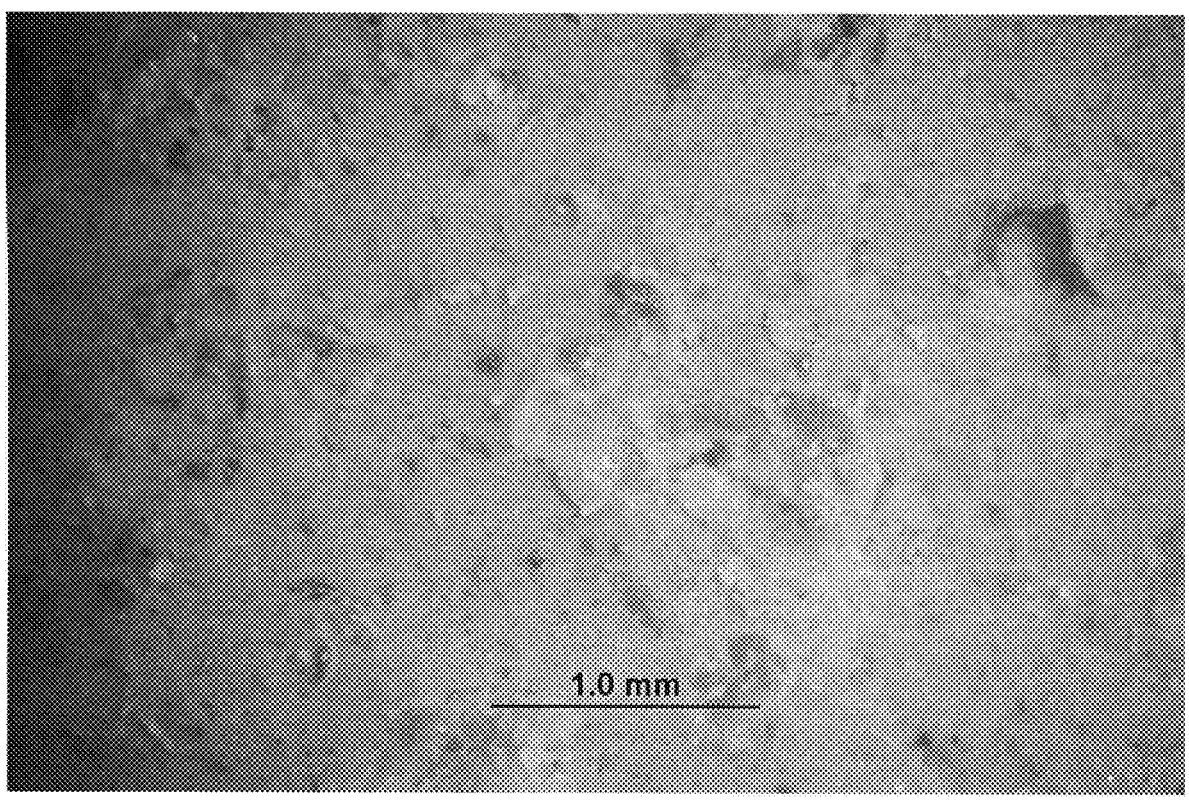
FIG. 4 is a photograph of the set cement cube of FIG. 5 after immersion in a water bath for twenty-four hours, in accordance with one embodiment of the present invention.

To evaluate the use of particles which swell in the presence of an aqueous fluid, a slurry was prepared containing 50% class A cement and 50% class A CKD. The slurry had a density of 13.2 ppg. Water-swellable polymer particles (sodium salt of poly(acrylic acid), lightly crosslinked, available from Aldrich, Milwaukee, Wis.) were added to this slurry in an amount of 20% by weight of the cement and CKD. The composition was poured into a cube and cured at room temperature for 24 hours. Thereafter, the cube was cut in half. FIG. 1 is a photograph of the halved cube taken with a stereomicroscope. The halved cube was then submerged in a water bath at room temperature. After 24 hours, the halved cube was removed from the water bath and photographed using the stereomicroscope. FIG. 2 is a photograph of the halved cube after immersion in the water bath for 24 hours. As illustrated by FIG. 4, the water-swellable polymer particles swelled in the presence of the water.

EXAMPLE 2

Figure 3:
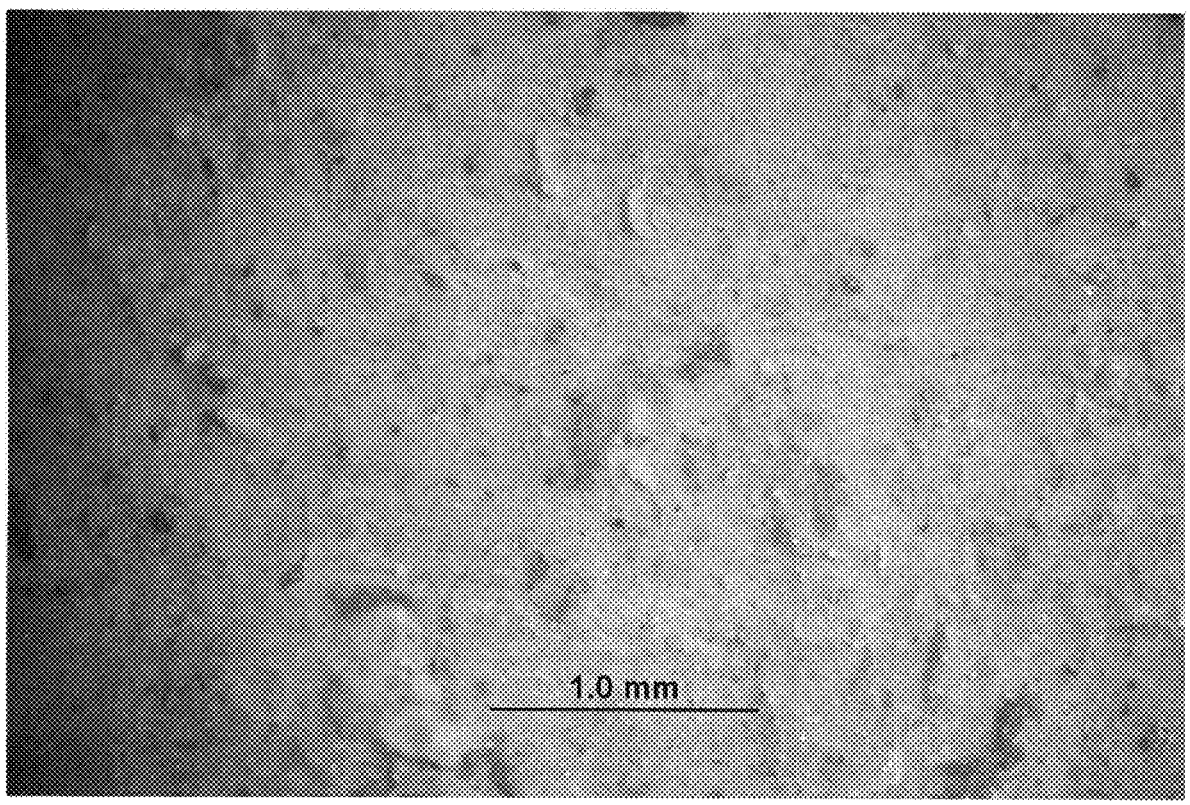
FIG. 3 is a photograph of a set cement cube comprising cement, cement kiln dust, and a water-swellable polymer, in accordance with one embodiment of the present invention.

To further evaluate the use of particles which swell in the presence of an aqueous fluid, a slurry was prepared containing 50% class A cement and 50% class A CKD. The slurry had a density of 13.2 ppg. Water-swellable polymer particles (sodium salt graft-poly(ethylene oxide) of poly(acrylic acid), crosslinked, available from Aldrich, Milwaukee, Wis.) were added to this slurry in an amount of 20% by weight of the cement and CKD. The composition was poured into a cube and cured at room temperature for 24 hours. Thereafter, the cube was cut in half. FIG. 3 is a photograph of the halved cube taken with a stereomicroscope. The halved cube was then submerged in a water bath at room temperature. After 24 hours, the halved cube was removed from the water bath and photographed using the stereomicroscope. FIG. 4 is a photograph of the halved cube after immersion in the water bath for 24 hours. As illustrated by FIG. 4, the water-swellable polymer particles swelled in the presence of the water.

EXAMPLE 3

To evaluate the use of particles which swell in the presence of oil, a slurry was prepared containing 50% class A cement and 50% class A CKD. To this slurry, oil-swellable elastomer particles (block copolymer of styrene-butadiene) were in an amount of 10% by weight of the cement and CKD. The composition had a density of 13.2 ppg. The composition was poured into three cubes, and the cubes were cured for 24 hours at room temperature. The cured cubes were measured for dimension and weight. The cubes were then submerged in a mineral oil bath. At the end of fixed periods of time, the cubes were weighed and the dimensions of the cubes were measured. Based on the weights of the cubes, the average amount of expansion was found to be 0.06% over 53 days. It is believed that increased cube weight was due to swelling of the elastomer particles from contact with the mineral oil. It is further believed that the swelling of the elastomer particles fills the porosity of the cubes. The expansion data for the cubes is set forth in the table below.

TABLE 1

| Day | Cube # | Width (cm) | Height (cm) | Weight (g) |
| --- | --- | --- | --- | --- |
| 1 | 1 | 5.08 | 5.11 | 222.96 |
|   | 2 | 5.08 | 5.13 | 226.86 |
|   | 3 | 5.13 | 5.08 | 227.53 |
| 4 | 1 | 5.08 | 5.13 | 222.73 |
|   | 2 | 5.11 | 5.13 | 226.74 |
|   | 3 | 5.13 | 5.11 | 227.32 |
| 7 | 1 | 5.13 | 5.11 | 222.85 |
|   | 2 | 5.11 | 5.13 | 226.79 |
|   | 3 | 5.13 | 5.11 | 227.43 |
| 12 | 1 | 5.13 | 5.08 | 222.98 |
|   | 2 | 5.11 | 5.13 | 226.94 |
|   | 3 | 5.11 | 5.16 | 227.68 |
| 25 | 1 | 5.08 | 5.13 | 223.31 |
|   | 2 | 5.08 | 5.13 | 227.22 |
|   | 3 | 5.08 | 5.13 | 228 |
| 32 | 1 | 5.11 | 5.13 | 223.25 |
|   | 2 | 5.11 | 5.13 | 227.16 |
|   | 3 | 5.08 | 5.13 | 227.97 |
| 39 | 1 | 5.08 | 5.13 | 223.04 |
|   | 2 | 5.11 | 5.13 | 226.8 |
|   | 3 | 5.11 | 5.13 | 227.72 |
| 46 | 1 | 5.08 | 5.11 | 223.37 |
|   | 2 | 5.08 | 5.13 | 227.11 |
|   | 3 | 5.13 | 5.08 | 227.9 |
| 53 | 1 | 5.08 | 5.13 | 223.16 |
|   | 2 | 5.11 | 5.13 | 226.9 |
|   | 3 | 5.13 | 5.11 | 227.72 |

EXAMPLE 4

To further evaluate the use of particles which swell in the presence of oil, a slurry was prepared containing 50% class A cement and 50% class A CKD. The slurry had a density of 13.5 ppg. Oil-swellable polymer particles (block copolymer of styrene-butadiene elastomer particles) were added to this slurry in an amount of 20% by weight of the cement and CKD. The composition was poured into three cubes, and the cubes were cured for 24 hours at room temperature. The cured cubes were measured for dimension and weight. The cured cubes were then submerged in a mineral oil bath. At the end of fixed periods of time, the cubes were weighed and the dimensions of the cubes were measured. Based on the weights of the cubes, the average amount of expansion was found to be 3.72% over 46 days. It is believed that increased cube weight was due to swelling of the elastomer particles from contact with the mineral oil. It is further believed that the swelling of the elastomer particles fills the porosity of the cubes. The expansion data for the cubes is set forth in the table below.

TABLE 2

| Day | Cube # | Width (cm) | Height (cm) | Weight (g) |
| --- | --- | --- | --- | --- |
| 1 | 1 | 5.16 | 5.11 | 211.23 |
|   | 2 | 5.08 | 5.16 | 210.34 |
|   | 3 | 5.08 | 5.13 | 212.22 |
| 6 | 1 | 5.16 | 5.11 | 214.44 |
|   | 2 | 5.13 | 5.18 | 213.47 |
|   | 3 | 5.13 | 5.18 | 215.27 |
| 13 | 1 | 5.13 | 5.16 | 215.98 |
|   | 2 | 5.13 | 5.16 | 214.68 |
|   | 3 | 5.13 | 5.21 | 216.68 |
| 19 | 1 | 5.13 | 5.18 | 216.58 |
|   | 2 | 5.13 | 5.16 | 215.15 |
|   | 3 | 5.16 | 5.21 | 217.17 |
| 26 | 1 | 5.16 | 5.21 | 217.51 |
|   | 2 | 5.13 | 5.18 | 215.98 |
|   | 3 | 5.16 | 5.21 | 218.05 |
| 33 | 1 | 5.16 | 5.21 | 218.45 |
|   | 2 | 5.13 | 5.18 | 216.62 |
|   | 3 | 5.16 | 5.23 | 218.73 |
| 40 | 1 | 5.16 | 5.11 | 219.42 |
|   | 2 | 5.08 | 5.16 | 217.5 |
|   | 3 | 5.08 | 5.13 | 219.53 |
| 47 | 1 | 5.16 | 5.11 | 219.97 |
|   | 2 | 5.13 | 5.18 | 217.82 |
|   | 3 | 5.13 | 5.18 | 219.59 |

EXAMPLE 5

Figure 5:
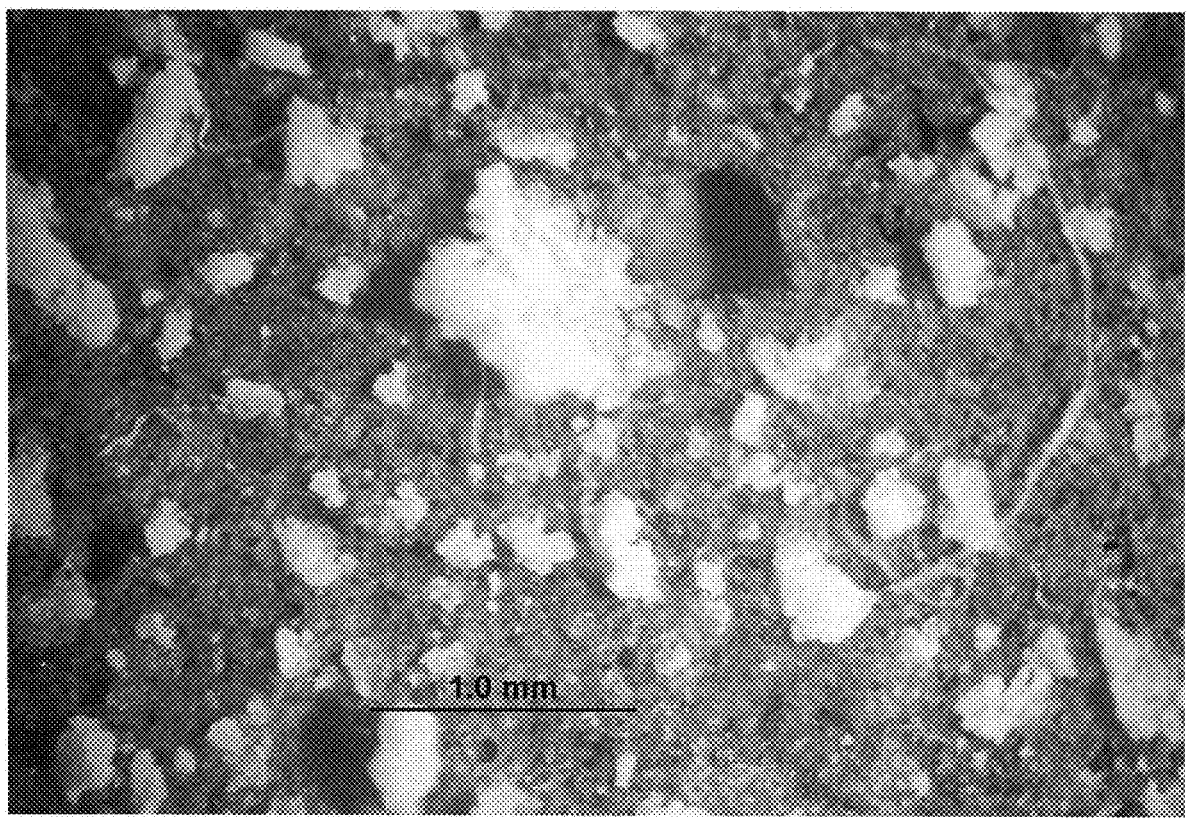
FIG. 5 is a photograph of a set cement cube comprising cement, cement kiln dust, and an oil-swellable elastomer, in accordance with one embodiment of the present invention.
Figure 6:
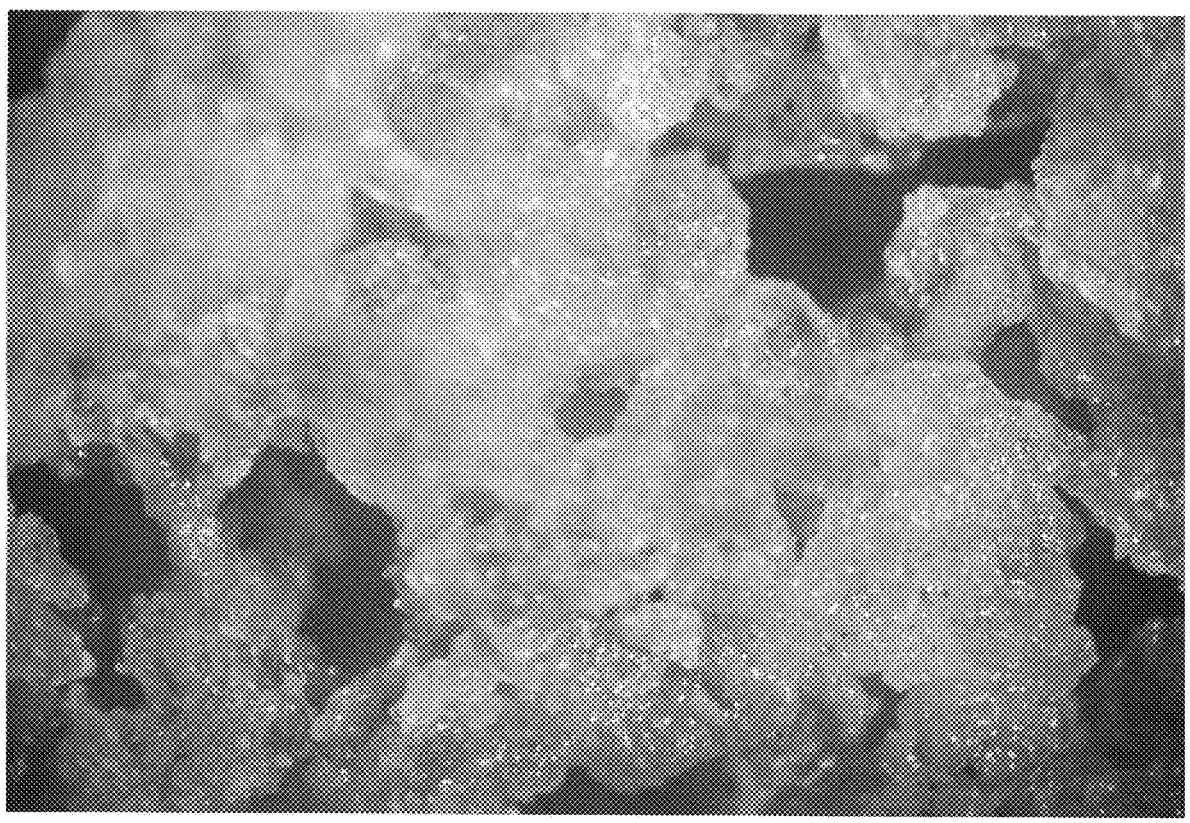
FIG. 6 is a photograph of the set cement cube of FIG. 7 after immersion in an oil bath for twenty-four hours, in accordance with one embodiment of the present invention.

To further evaluate the use of particles which swell in the presence of oil, a slurry was prepared containing 50% class A cement and 50% class A CKD. The slurry had a density of 13.2 ppg. Oil-swellable elastomer particles (block copolymer of styrene-butadiene elastomer particles) were added to this slurry in an amount of 20% by weight of the cement and CKD. The composition was poured into a cube and cured at room temperature for 24 hours. Thereafter, the cube was cut in half. FIG. 5 is a photograph of the halved cube taken with a stereomicroscope. The halved cube was then submerged in a mineral oil bath at room temperature. After 24 hours, the halved cube was removed from the oil bath and photographed using the stereomicroscope. FIG. 6 is a photograph of the halved cube after immersion in the oil bath for 24 hours. As illustrated by FIG. 6, the oil-swellable elastomer particles swelled in the presence of the oil.

EXAMPLE 6

This example was performed to determine whether the expansion of the cubes observed in Examples 1-8 was due to swelling of the elastomer particles or absorption of the water or mineral oil by the cubes. A 13.2 ppg slurry was prepared containing 50% class A cement and 50% class A CKD. No swellable particles were included in this sample composition. The slurry was shaped into a cube, and the cube was cured at room temperature for 24 hours. The cured cube was weighed. The cubes were then submerged in a water bath. After 7 days, the cube was weighed again. As illustrated in the table below, the cube absorbed an insignificant amount of water.

TABLE 3

| Day | Weight (g) |
|-----|------------|
| 1   | 206.10     |
| 8   | 206.27     |

EXAMPLE 7

As a second comparative example, Example 2 was repeated, except that the cubes were submerged in a mineral oil bath. The cubes were weighed after curing and again after 7 days. As illustrated in the table below, the cube absorbed an insignificant amount of mineral oil.

TABLE 4

| Day | Weight (g) |
|-----|------------|
| 1   | 203.99     |
| 8   | 204.06     |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (for example, of the form "from about a to about b," or, "from about a to b," or, "from a to about b," or, "from a to b,") disclosed herein is to be understood as referring to the power set (the set of all subsets) of the respective range of values, and set forth every range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
    introducing a settable composition into a subterranean formation, wherein the settable composition comprises:
        a cementitious component comprising:
            a hydraulic cement, and
            cement kiln dust;
        a swellable particle; and
        water; and
    allowing the settable composition to set in the subterranean formation.

2. The method of claim 1 wherein the cement kiln dust is present in the settable composition in an amount of about 25% to about 75% by weight of the cementitious component, and wherein the hydraulic cement is present in the settable composition in an amount of about 50% to about 75% by weight of the cementitious component.

3. The method of claim 1 wherein the cement kiln dust is present in the settable composition in an amount of about 25% to about 50% by weight of the cementitious component, and wherein the hydraulic cement is present in the settable composition in an amount of about 25% to about 75% by weight of the cementitious component.

4. The method of claim 1 wherein the swellable particle is present in the settable composition in an amount of about 5% to about 25% by weight of the cementitious component.

5. The method of claim 1 wherein the swellable particle is present in the settable composition in an amount of about 15% to about 20% by weight of the cementitious component.

6. The method of claim 1 wherein the swellable particle swells upon contact with an aqueous fluid.

7. The method of claim 1 wherein the swellable particle swells upon contact with oil.

8. The method of claim 1 wherein the swellable particle comprises a water-swellable polymer.

9. The method of claim 1 wherein the swellable particle comprises a swellable elastomer.

10. The method of claim 1 wherein the swellable particle comprises a block copolymer of styrene butadiene rubber.

11. The method of claim 1 wherein the swellable particle comprises a sodium salt of polyacrylic acid.

12. A method comprising:
    introducing a settable composition into an annulus between a pipe string and a subterranean formation, wherein the settable composition comprises:
        a cementitious component comprising:
            a hydraulic cement, and
            cement kiln dust;
        a swellable particle; and
        water; and
    allowing the settable composition to set in the annulus.

13. The method of claim 12 comprising introducing the pipe string into a well bore that penetrates the subterranean formation.

14. The method of claim 12 wherein the cement kiln dust is present in the settable composition in an amount of about 25% to about 75% by weight of the cementitious component, and wherein the hydraulic cement is present in the settable composition in an amount of about 25% to about 75% by weight of the cementitious component.

15. The method of claim 12 wherein the swellable particle is present in the settable composition in an amount of about 5% to about 25% by weight of the cementitious component.

16. The method of claim 12 wherein the swellable particle swells upon contact with an aqueous fluid.

17. The method of claim 12 wherein the swellable particle swells upon contact with oil.

18. The method of claim 12 wherein the swellable particle comprises a block copolymer of styrene butadiene rubber.

19. The method of claim 1 wherein the swellable particle comprises a sodium salt of polyacrylic acid.

20. A method comprising:
    introducing a settable composition into an annulus between a pipe string and a subterranean formation, wherein the settable composition comprises:
        a cementitious component comprising:
            a hydraulic cement in an amount of about 25% to about 75% by weight of the cementitious component, and
            cement kiln dust in an amount of about 25% to about 75% by weight of the cementitious component;
        a swellable particle in an amount of about 5% to about 25% by weight of the cementitious component and comprising at least one swellable polymer selected from the group consisting of a block copolymer of styrene butadiene rubber, a sodium salt of polyacrylic acid, and combinations thereof; and
        water; and
    allowing the settable composition to set in the annulus.

* * * * *